United States Patent
Okada

(10) Patent No.: US 12,496,045 B2
(45) Date of Patent: Dec. 16, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Yuto Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 80 days.

(21) Appl. No.: 18/488,021

(22) Filed: Oct. 16, 2023

(65) Prior Publication Data
US 2024/0130713 A1  Apr. 25, 2024
US 2024/0225608 A9  Jul. 11, 2024

(30) Foreign Application Priority Data

Oct. 19, 2022 (JP) .................................. 2022-167898

(51) Int. Cl.
*A61B 8/00* (2006.01)
*A61B 8/08* (2006.01)

(52) U.S. Cl.
CPC ............ *A61B 8/5215* (2013.01); *A61B 8/085* (2013.01); *A61B 8/4444* (2013.01); *A61B 8/461* (2013.01); *A61B 8/5207* (2013.01)

(58) Field of Classification Search
CPC ..... A61B 8/5212; A61B 8/5207; A61B 8/085; A61B 8/4444; A61B 8/461
See application file for complete search history.

(56) References Cited

U.S. PATENT DOCUMENTS

| | | |
|---|---|---|
| 2018/0140281 A1 | 5/2018 | Imai |
| 2018/0353156 A1 | 12/2018 | Mehanian et al. |
| 2021/0128112 A1 | 5/2021 | Hatlan et al. |
| 2021/0353260 A1 | 11/2021 | Srinivasa Naidu et al. |

FOREIGN PATENT DOCUMENTS

JP   6419976 B2   11/2018

OTHER PUBLICATIONS

The extended European search report issued by the European Patent Office on Mar. 25, 2024, which corresponds to European Application No. 23204460.2-1126 and is related to U.S. Appl. No. 18/488,021.

*Primary Examiner* — Chao Sheng
(74) *Attorney, Agent, or Firm* — Studebaker Brackett PLLC

(57) ABSTRACT

Provided are a control method of an ultrasound diagnostic apparatus and an ultrasound diagnostic apparatus capable of improving detection accuracy of a target inside a subject. An ultrasound diagnostic apparatus includes: an ultrasound probe; an image acquisition unit that acquires an ultrasound image of a subject using the ultrasound probe and in accordance with a plurality of parameters related to image acquisition; a specific target detection unit that detects a specific target from the ultrasound image using a machine learning model; and a parameter setting unit that sets, for a parameter which is settable by a user among the plurality of parameters, different adjustment ranges of the parameter during an operation and during a non-operation of the specific target detection unit and that supplies the parameter, which is adjusted by the user, to the image acquisition unit.

20 Claims, 8 Drawing Sheets

ULTRASOUND DIAGNOSTIC APPARATUS AND CONTROL METHOD OF ULTRASOUND DIAGNOSTIC APPARATUS

CROSS-REFERENCE TO RELATED APPLICATIONS

The present application claims priority under 35 U.S.C. § 119 to Japanese Patent Application No. 2022-167898, filed on Oct. 19, 2022. The above application is hereby expressly incorporated by reference, in its entirety, into the present application.

BACKGROUND OF THE INVENTION

1. Field of the Invention

The present invention relates to an ultrasound diagnostic apparatus and a control method of an ultrasound diagnostic apparatus for detecting a specific target from an ultrasound image.

2. Description of the Related Art

Conventionally, a subject has been examined by capturing an ultrasound image of an inside of the subject using a so-called ultrasound diagnostic apparatus. A user of the ultrasound diagnostic apparatus usually confirms the captured ultrasound image to determine whether or not a target such as an organ inside the subject is depicted in the ultrasound image. However, there may be cases where it may be difficult to accurately determine whether or not the target is depicted in the ultrasound image, depending on the image quality of the ultrasound image, the proficiency level of the user, and the like.

In that respect, a technology for automatically detecting a specific target inside a subject from an ultrasound image, for example, as disclosed in JP6419976B, has been developed. JP6419976B also discloses a technology for automatically setting imaging conditions of the ultrasound image, which include, for example, a so-called gain and the like, according to the detected target.

SUMMARY OF THE INVENTION

The target such as an organ inside the subject can be automatically detected by using the technology of JP6419976B, but there may be cases where detection accuracy decreases depending on the imaging conditions and types of the target in performing detection processing of the target.

The present invention has been made in order to solve such a conventional problem, and an object of the present invention is to provide an ultrasound diagnostic apparatus and a control method of an ultrasound diagnostic apparatus capable of improving detection accuracy of a target inside a subject.

According to the following configuration, the above-described object can be achieved.

[1] An ultrasound diagnostic apparatus comprising:
an ultrasound probe;
an image acquisition unit configured to acquire an ultrasound image of a subject using the ultrasound probe and in accordance with a plurality of parameters related to image acquisition;
a specific target detection unit configured to detect a specific target from the ultrasound image using a machine learning model; and
a parameter setting unit configured to set, for a parameter that is settable by a user among the plurality of parameters, different adjustment ranges of the parameter during an operation and during a non-operation of the specific target detection unit and to supply the parameter, which is adjusted by the user, to the image acquisition unit.

[2] The ultrasound diagnostic apparatus according to [1], further comprising:
a monitor configured to display the ultrasound image; and
a display controller configured to display the ultrasound image on the monitor in different modes during the operation and during the non-operation of the specific target detection unit.

[3] The ultrasound diagnostic apparatus according to [2],
in which the display controller is configured to display the adjustment range, which is set by the parameter setting unit and is different from the adjustment range during the non-operation of the specific target detection unit, during the operation of the specific target detection unit on the monitor.

[4] The ultrasound diagnostic apparatus according to any one of [1] to [3],
in which the parameter setting unit is configured to set and supply the adjustment range of the parameter corresponding to the target, which is detected from the ultrasound image, to the image acquisition unit during the operation of the specific target detection unit.

[5] The ultrasound diagnostic apparatus according to any one of [1] to [4],
in which the specific target detection unit is configured to detect, as the specific target, any of an organ, a blood vessel, a stool, a urine, a nerve, an ascites fluid, a pleural fluid, a suspected abnormal site, or a B-line.

[6] The ultrasound diagnostic apparatus according to any one of [1] to [5],
in which the parameter setting unit is configured to set the adjustment range of at least one parameter of a depth, a gain, or a sound velocity.

[7] The ultrasound diagnostic apparatus according to any one of [1] to [6],
in which the parameter setting unit is configured to set and supply different presets to the image acquisition unit during the operation and during the non-operation of the specific target detection unit for a preset that is not settable by the user among the plurality of parameters.

[8] A control method of an ultrasound diagnostic apparatus including an ultrasound probe, an image acquisition unit, a specific target detection unit, and a parameter setting unit, the control method comprising:
causing the image acquisition unit to acquire an ultrasound image of a subject using the ultrasound probe and in accordance with a plurality of parameters related to image acquisition;
causing the specific target detection unit to detect a specific target from the ultrasound image using a machine learning model; and
causing the parameter setting unit to set, for a parameter that is settable by a user among the plurality of parameters, different adjustment ranges of the parameter during an operation and during a non-operation of the specific target detection unit and to supply the parameter, which is adjusted by the user, to the image acquisition unit.

According to the present invention, an ultrasound diagnostic apparatus comprises: an ultrasound probe; an image acquisition unit that acquires an ultrasound image of a subject using the ultrasound probe and in accordance with a plurality of parameters related to image acquisition; a specific target detection unit that detects a specific target from the ultrasound image using a machine learning model; and a parameter setting unit that sets, for a parameter which is settable by a user among the plurality of parameters, different adjustment ranges of the parameter during an operation and during a non-operation of the specific target detection unit and that supplies the parameter, which is adjusted by the user, to the image acquisition unit. Therefore, the detection accuracy of the target inside the subject can be improved.

DESCRIPTION OF THE PREFERRED EMBODIMENTS

Hereinafter, embodiments of the present invention will be described with reference to the accompanying drawings.

The description of configuration requirements to be described below is made based on a representative embodiment of the present invention, but the present invention is not limited to such an embodiment.

In the present specification, a numerical range represented by "to" means a range including numerical values described before and after "to" as a lower limit value and an upper limit value, respectively.

In the present specification, "same" and "identical" include an error range generally allowed in the technical field.

Embodiment

Figure 1:
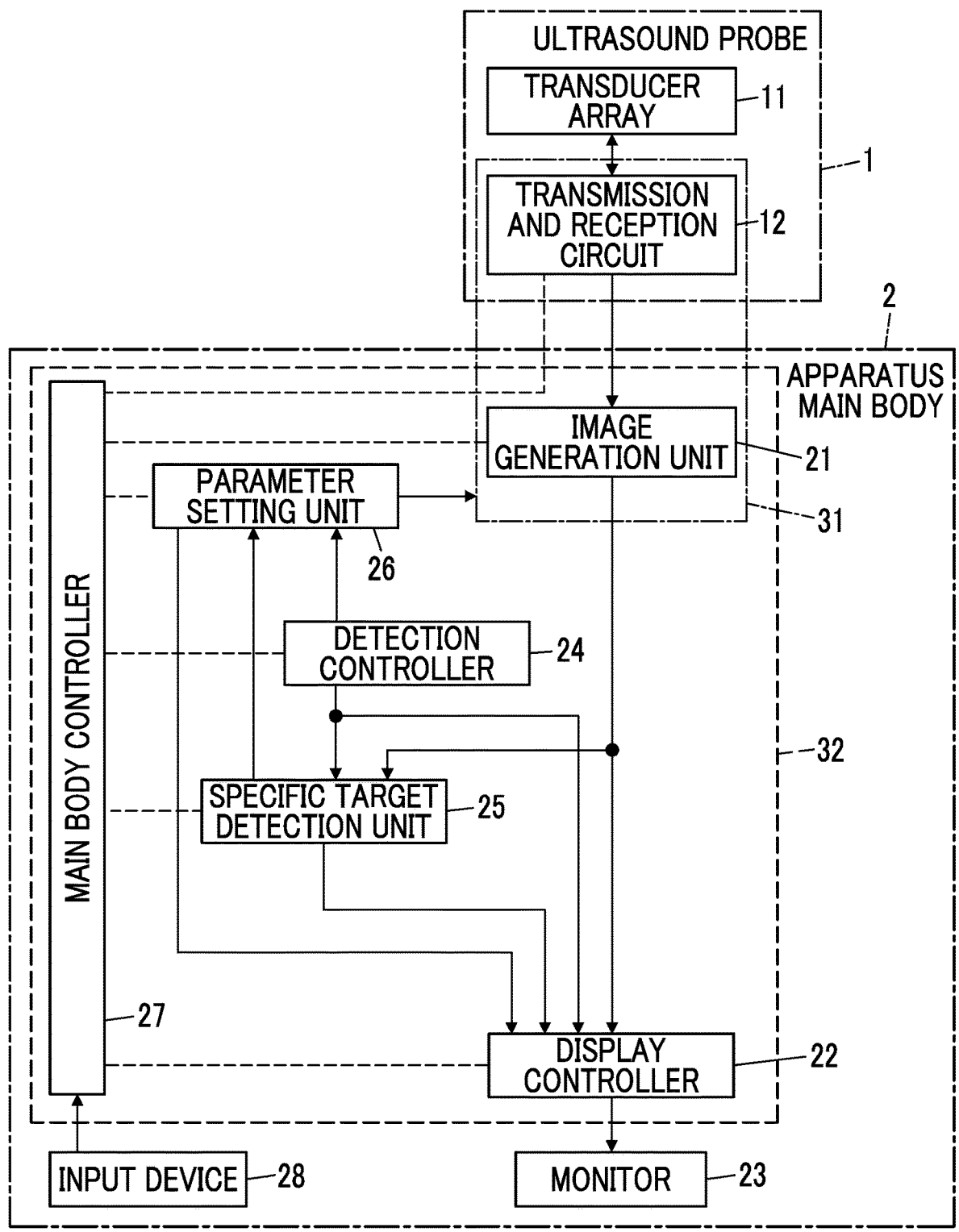
FIG. 1 is a block diagram showing a configuration of an ultrasound diagnostic apparatus according to an embodiment of the present invention.

FIG. 1 shows a configuration of an ultrasound diagnostic apparatus according to an embodiment of the present invention. The ultrasound diagnostic apparatus comprises an ultrasound probe 1 and an apparatus main body 2 connected to the ultrasound probe 1.

The ultrasound probe 1 includes a transducer array 11. A transmission and reception circuit 12 is connected to the transducer array 11.

The apparatus main body 2 includes an image generation unit 21 connected to the transmission and reception circuit 12 of the ultrasound probe 1. A display controller 22 and a monitor 23 are sequentially connected to the image generation unit 21. The transmission and reception circuit 12 and the image generation unit 21 constitute an image acquisition unit 31. In addition, the apparatus main body 2 comprises a detection controller 24. A specific target detection unit 25 is connected to the image generation unit 21 and the detection controller 24. A parameter setting unit 26 is connected to the detection controller 24 and the specific target detection unit 25. The parameter setting unit 26 is connected to the image acquisition unit 31. In addition, the detection controller 24, the specific target detection unit 25, and the parameter setting unit 26 are connected to the display controller 22. Further, a main body controller 27 is connected to the image generation unit 21, the display controller 22, the detection controller 24, the specific target detection unit 25, and the parameter setting unit 26. An input device 28 is connected to the main body controller 27.

Further, the image generation unit 21, the display controller 22, the detection controller 24, the specific target detection unit 25, the parameter setting unit 26, and the main body controller 27 constitute a processor 32 for the apparatus main body 2.

The transducer array 11 of the ultrasound probe 1 includes a plurality of ultrasound transducers one-dimensionally or two-dimensionally arranged. Each of these ultrasound transducers transmits an ultrasound wave in accordance with a drive signal supplied from the transmission and reception circuit 12 and receives an ultrasound echo from a subject to output a signal based on the ultrasound echo. For example, each ultrasound transducer is composed of a piezoelectric body consisting of a piezoelectric ceramic represented by lead zirconate titanate (PZT), a polymer piezoelectric element represented by poly vinylidene di fluoride (PVDF), a piezoelectric single crystal represented by lead magnesium niobate-lead titanate (PMN-PT), or the like, and electrodes formed at both ends of the piezoelectric body.

Figure 2:
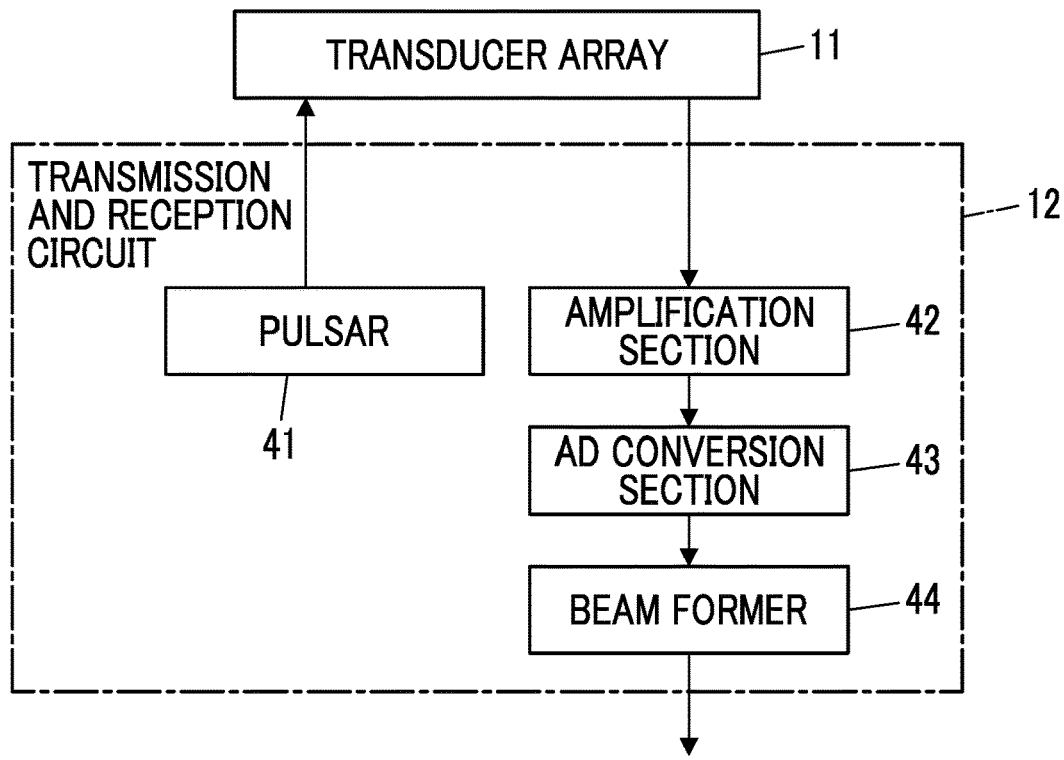
FIG. 2 is a block diagram showing a configuration of a transmission and reception circuit in the embodiment of the present invention.

The transmission and reception circuit 12 transmits the ultrasound wave from the transducer array 11 and generates a sound ray signal based on a reception signal acquired by the transducer array 11, under the control of the main body controller 27. As shown in FIG. 2, the transmission and reception circuit 12 includes a pulsar 41 connected to the transducer array 11, and an amplification section 42, an analog-to-digital (AD) conversion section 43, and a beam former 44 that are sequentially connected in series to the transducer array 11.

The pulsar 41 includes, for example, a plurality of pulse generators, and adjusts an amount of delay of each of drive signals and supplies the drive signals to the plurality of ultrasound transducers such that ultrasound waves transmitted from the plurality of ultrasound transducers of the transducer array 11 form an ultrasound beam based on a transmission delay pattern selected according to a control signal from the main body controller 27. In this way, in a case where a pulsed or continuous wave-like voltage is applied to the electrodes of the ultrasound transducer of the transducer array 11, the piezoelectric body expands and contracts to generate a pulsed or continuous wave-like ultrasound wave from each of the ultrasound transducers, whereby an ultrasound beam is formed from the combined wave of these ultrasound waves.

The transmitted ultrasound beam is reflected in, for example, a target such as a site of the subject and propagates toward the transducer array 11 of the ultrasound probe 1. The ultrasound echo propagating toward the transducer array 11 in this way is received by each of the ultrasound transducers constituting the transducer array 11. In this case, each of the ultrasound transducers constituting the transducer array 11 receives the propagating ultrasound echo to expand and contract to generate a reception signal, which is an electrical signal, and outputs these reception signals to the amplification section 42.

The amplification section 42 amplifies the signal input from each of the ultrasound transducers constituting the transducer array 11 and transmits the amplified signal to the AD conversion section 43. The AD conversion section 43 converts the signal transmitted from the amplification section 42 into digital reception data. The beam former 44 performs so-called reception focus processing by applying and adding a delay to each reception data received from the AD conversion section 43. By this reception focus processing, each reception data converted by the AD conversion section 43 is phase-added, and a sound ray signal in which the focus of the ultrasound echo is narrowed down is acquired.

Figure 3:
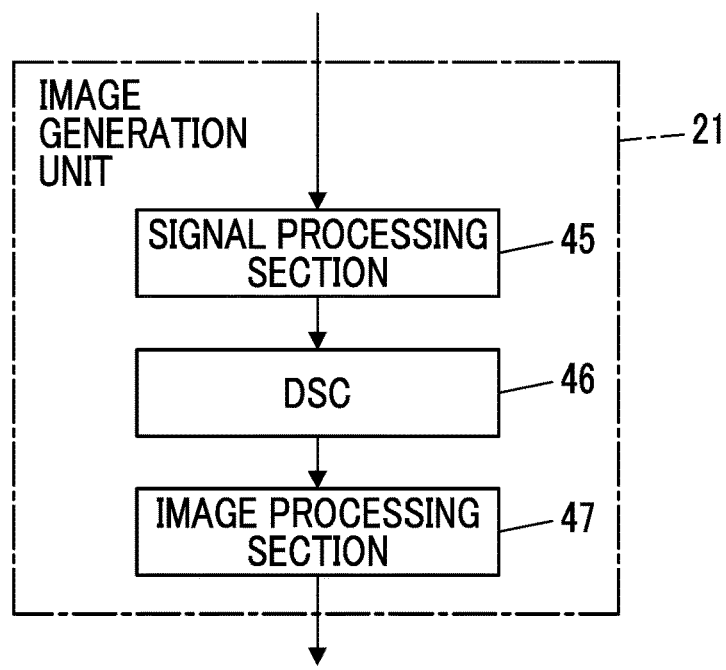
FIG. 3 is a block diagram showing a configuration of an image generation unit in the embodiment of the present invention.

As shown in FIG. 3, the image generation unit 21 has a configuration in which a signal processing section 45, a digital scan converter (DSC) 46, and an image processing section 47 are sequentially connected in series.

The signal processing section 45 generates a B-mode image signal, which is tomographic image information regarding tissues inside the subject, by performing, on the sound ray signal received from the transmission and reception circuit 12, correction of the attenuation due to the distance according to the depth of the reflection position of the ultrasound wave using a sound velocity value set by the main body controller 27 and then performing envelope detection processing.

The DSC 46 converts (raster-converts) the B-mode image signal generated by the signal processing section 45 into an image signal in accordance with a normal television signal scanning method.

The image processing section 47 performs various types of necessary image processing such as gradation processing on the B-mode image signal input from the DSC 46 and then sends out the B-mode image signal to the display controller 22 and the specific target detection unit 25. Hereinafter, the B-mode image signal that has been subjected to image processing by the image processing section 47 is referred to as an ultrasound image.

The main body controller 27 controls each unit of the apparatus main body 2 and the ultrasound probe 1 in accordance with a program recorded in advance, or the like.

The input device 28 accepts an input operation from a user and sends out input information to the main body controller 27. The input device 28 is composed of, for example, a device that is used for the user to perform an input operation, such as a keyboard, a mouse, a trackball, a touchpad, or a touch panel.

The specific target detection unit 25 uses a so-called machine learning model to detect a specific target, for example, an organ, a blood vessel, a stool present inside the large intestine and a urine present inside the bladder, a nerve, an ascites fluid, a pleural fluid, a suspected abnormal site such as a tumor or a cyst, an artifact called a so-called B-line, and the like, from the ultrasound image generated by the image generation unit 21. The machine learning model has learned in advance a large number of ultrasound images showing the specific target inside the subject, and receives an input of the ultrasound image and then automatically analyzes the input ultrasound image to output a detection result of the specific target. In addition, the specific target detection unit 25 can also detect a size such as a length or a diameter of the specific target. For example, after detecting the target, the specific target detection unit 25 can measure the size of the detected target. In addition, the specific target detection unit 25 can also detect the size of the specific target from the ultrasound image including the target by using a machine learning model that has learned in advance a large number of combinations of a large number of ultrasound images showing the specific target inside the subject and size values measured for the target.

The detection controller 24 controls the specific target detection unit 25 to be in either an operation state or a non-operation state, based on, for example, an instruction from the user via the input device 28. In addition, the detection controller 24 designates the type of the target to be detected by the specific target detection unit 25 based on, for example, an instruction from the user via the input device 28. The specific target detection unit 25 performs processing of detecting a target designated by the detection controller 24 from the ultrasound image.

The parameter setting unit 26 sets, for a parameter that is settable by the user, such as a depth, a gain, and a sound velocity, among a plurality of parameters related to the acquisition of the ultrasound image, different adjustment ranges of the parameter during the operation and during the non-operation of the specific target detection unit 25, and supplies the parameter, which is adjusted by the user, to the image acquisition unit 31.

Usually, since the depth from the body surface, the size, the types of the surrounding tissue structures, the types of the surrounding organs, and the like differ for each target inside the subject, suitable values of the parameters for clearly depicting the target in the ultrasound image also differ. The parameter setting unit 26 automatically sets an adjustment range restricted for the parameter such that the specific target designated by the detection controller 24 is particularly clearly depicted during the operation of the specific target detection unit 25, and supplies the parameter that is set in this adjustment range by the user, for example, via the input device 28, to the image acquisition unit 31. The image acquisition unit 31 can acquire an ultrasound image particularly clearly showing the specific target by using the supplied parameter. The specific target detection unit 25 performs processing of detecting the specific target from the ultrasound image acquired in this manner, whereby the detection accuracy of the specific target can be improved.

In addition, the parameter setting unit 26 can set an adjustment range in which the range is not restricted for the parameter such that the entire ultrasound image can be relatively clearly depicted during the non-operation of the specific target detection unit 25. By setting the parameter in this adjustment range, the user can acquire an ultrasound image in which the entire image is relatively clearly depicted. The ultrasound image acquired in this manner is suitable for a case where the user confirms the entire ultrasound image, for example, in a case where the ultrasound image includes a plurality of organs.

The display controller 22 performs predetermined processing on the ultrasound image or the like generated by the image generation unit 21 and displays the ultrasound image or the like on the monitor 23, under the control of the main body controller 27.

Figure 4:
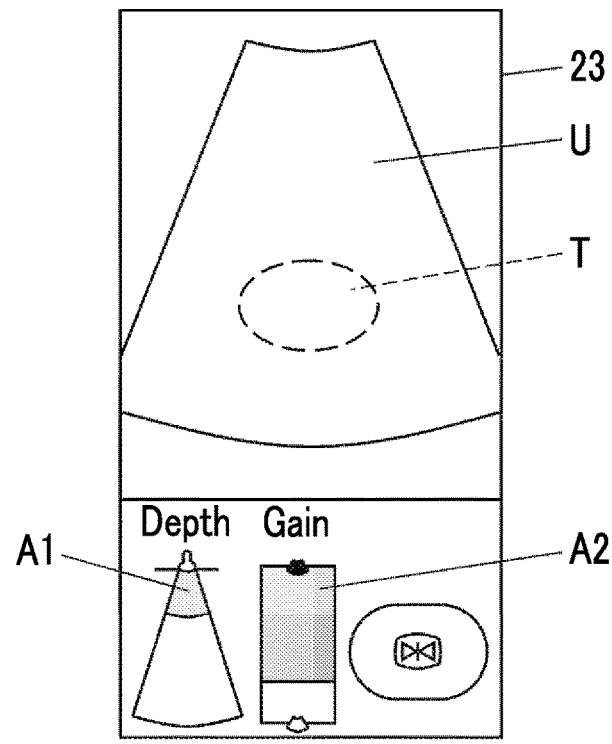
FIG. 4 is a diagram showing an example of a display screen of a monitor during a non-operation of the specific target detection unit.

In addition, for example, as shown in FIG. 4, the display controller 22 can display user interfaces A1 and A2, which are used for the user to set parameters, on the monitor 23 together with the ultrasound image U. FIG. 4 shows an example of a display screen of the monitor 23 during the non-operation of the specific target detection unit 25. For example, the user interface A1 is used for the user to set the depth, and the user interface A2 is used for the user to set the gain.

Figure 5:
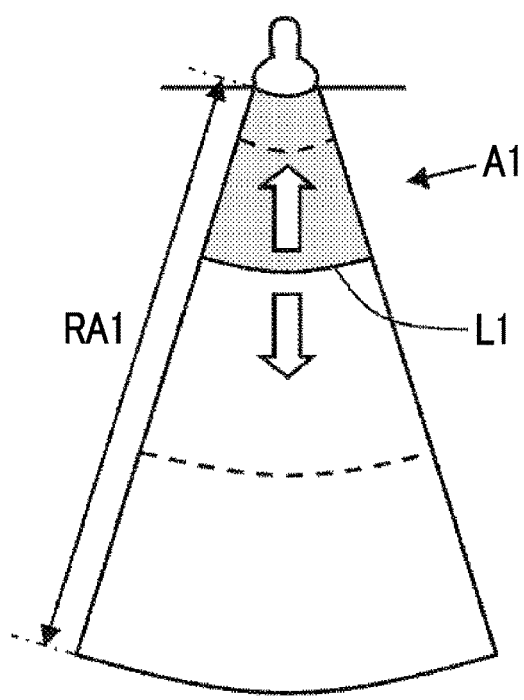
FIG. 5 is a diagram showing an example of a user interface for setting a depth during the non-operation of the specific target detection unit.

Regarding the user interface A1, for example, as shown in FIG. 5, any position within the user interface A1 is dragged up or down by a mouse or the like in a state of being selected, a swipe up or down is performed inside the user interface A1 via a touch panel, or the like, whereby a parameter setting line L1 is moved up or down, and the depth corresponding to the position of the parameter setting line L1 is set. The parameter setting unit 26 can set, for example, an adjustment range RA1 ranging from an upper limit to a lower limit, which is settable through the user interface A1, during the non-operation of the specific target detection unit 25.

Figure 6:
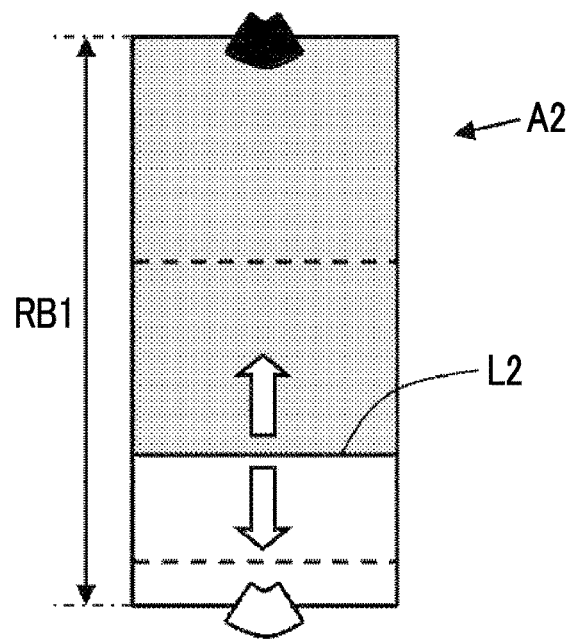
FIG. 6 is a diagram showing an example of a user interface for setting a gain during the non-operation of the specific target detection unit.

Regarding the user interface A2, for example, as shown in FIG. 6, any position within the user interface A2 is dragged up or down by a mouse or the like in a state of being selected, a swipe up or down is performed inside the user interface A2 via a touch panel, or the like, whereby a parameter setting line L2 is moved up or down, and the gain corresponding to the position of the parameter setting line L2 is set. The parameter setting unit 26 can set, for example, an adjustment range RB1 ranging from an upper limit to a lower limit, which is settable through the user interface A2, during the non-operation of the specific target detection unit 25.

Figure 7:
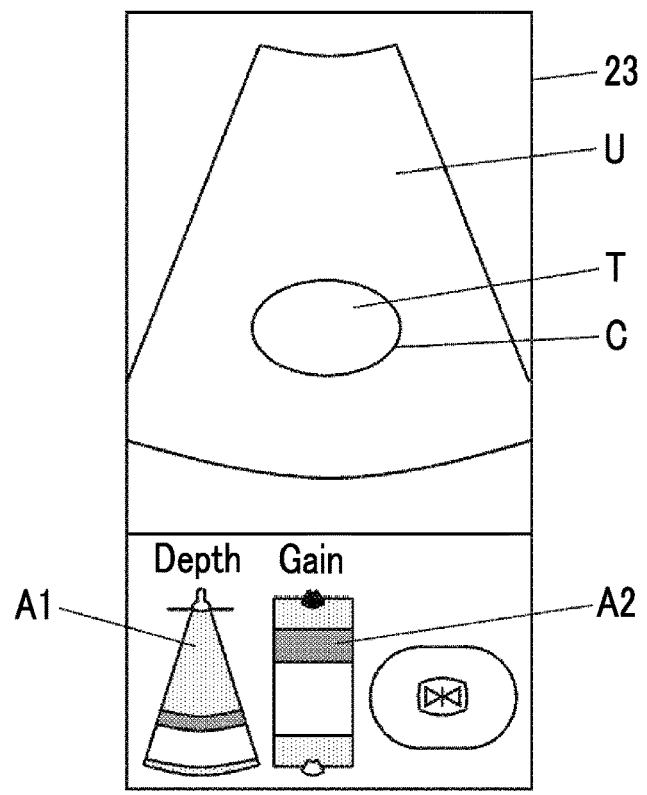
FIG. 7 is a diagram showing an example of a display screen of the monitor during an operation of the specific target detection unit.

FIG. 7 shows an example of a display screen of the monitor 23 during the operation of the specific target detection unit 25. Since the adjustment range of the parameter is restricted by the parameter setting unit 26, the display controller 22 can change display modes of the user interfaces A1 and A2 in accordance with this restriction.

Figure 8:
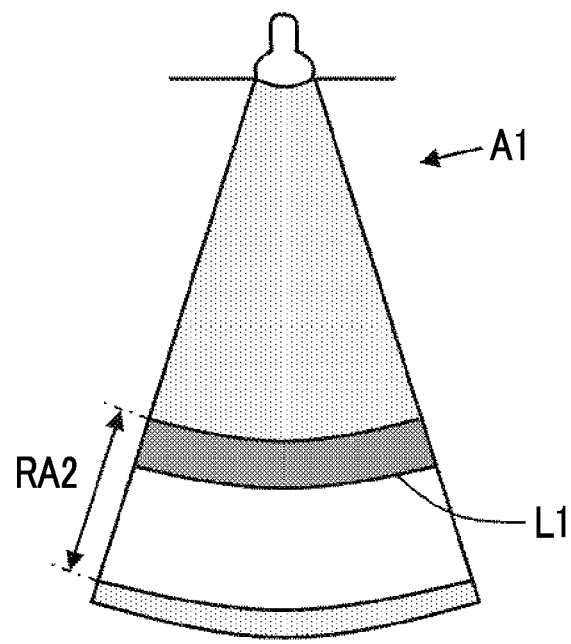
FIG. 8 is a diagram showing an example of the user interface for setting the depth during the operation of the specific target detection unit.

For example, as shown in FIG. 8, the display controller 22 can display a restricted adjustment range RA2 of the depth settable by the user by using a display mode different from the display mode of other ranges in the user interface A1 for setting the depth. The user can set the depth by moving the position of the parameter setting line L1 in the adjustment range RA2 displayed in this manner.

Figure 9:
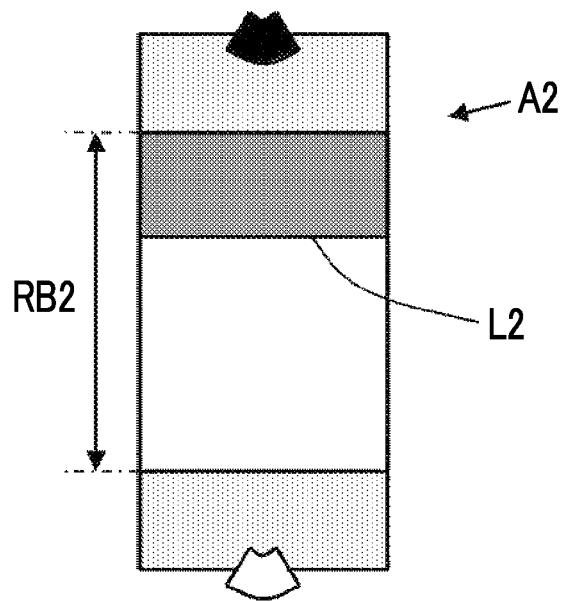
FIG. 9 is a diagram showing an example of the user interface for setting the gain during the operation of the specific target detection unit.

In addition, for example, as shown in FIG. 9, the display controller 22 can display a restricted adjustment range RB2 of the gain settable by the user by using a display mode different from the display mode of other ranges in the user interface A2 for setting the gain. The user can set the gain by moving the position of the parameter setting line L2 in the adjustment range RB2 displayed in this manner.

Figure 10:
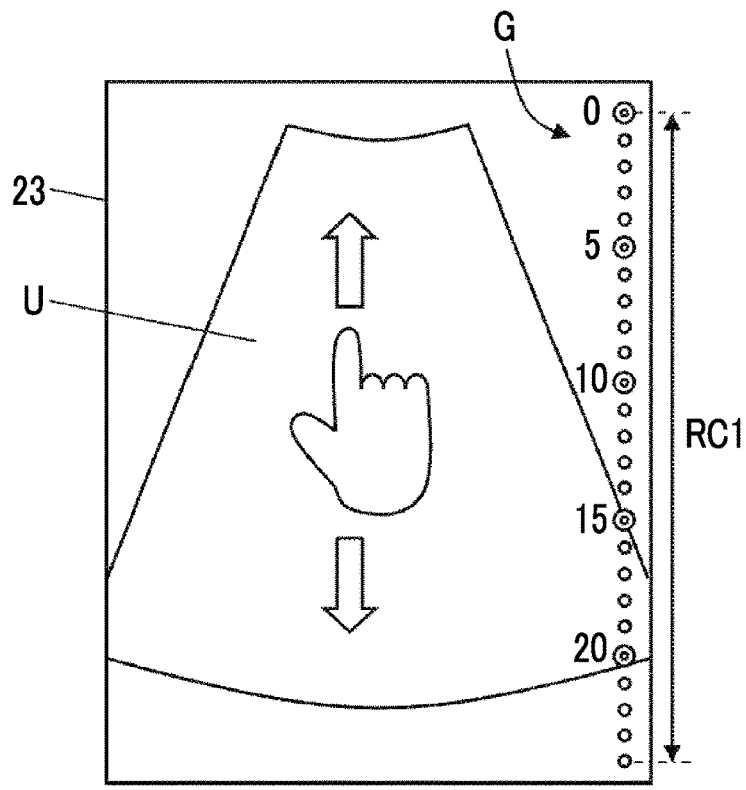
FIG. 10 is a diagram showing a first modification example of a user interface for setting a parameter during the non-operation of the specific target detection unit.

In addition, for example, as shown in FIG. 10, the display controller 22 can display the entire display screen of the monitor 23 as the user interface for setting the parameter settable by the user, such as the depth, the gain, and the sound velocity, and can further display a gradation G indicating values of the parameter on the monitor 23. FIG. 10 shows an example of the display screen of the monitor 23 during the non-operation of the specific target detection unit 25. The user can set the parameter by, for example, performing a swipe up or down at any position on the display screen of the monitor 23 via a touch panel disposed by overlapping the monitor 23. In this case, the value of the parameter is indicated by highlighting the position of the gradation G corresponding to the set value of the parameter. The user can set the parameter within an adjustment range RC1 ranging from the upper limit to the lower limit of the parameter represented by the gradation G during the non-operation of the specific target detection unit 25.

Figure 11:
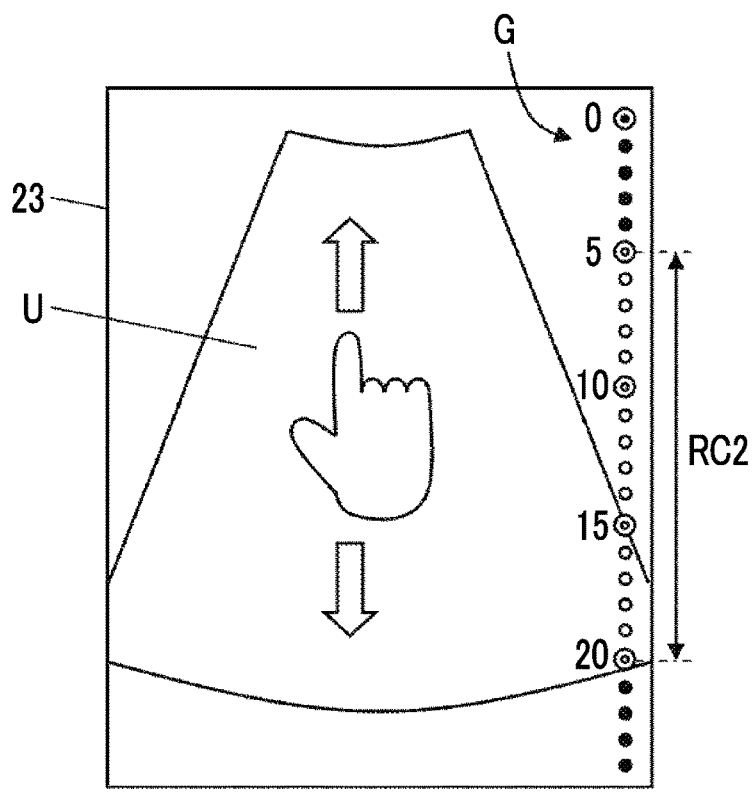
FIG. 11 is a diagram showing a first modification example of the user interface for setting the parameter during the operation of the specific target detection unit.

For example, as shown in FIG. 11, the display controller 22 can display an adjustment range RC2, which is restricted by the parameter setting unit 26, by changing the display mode of the gradation G during the operation of the specific target detection unit 25. The user can set the parameter in the adjustment range RC2 by, for example, performing a swipe up or down at any position on the display screen of the monitor 23 via the touch panel.

Figure 12:
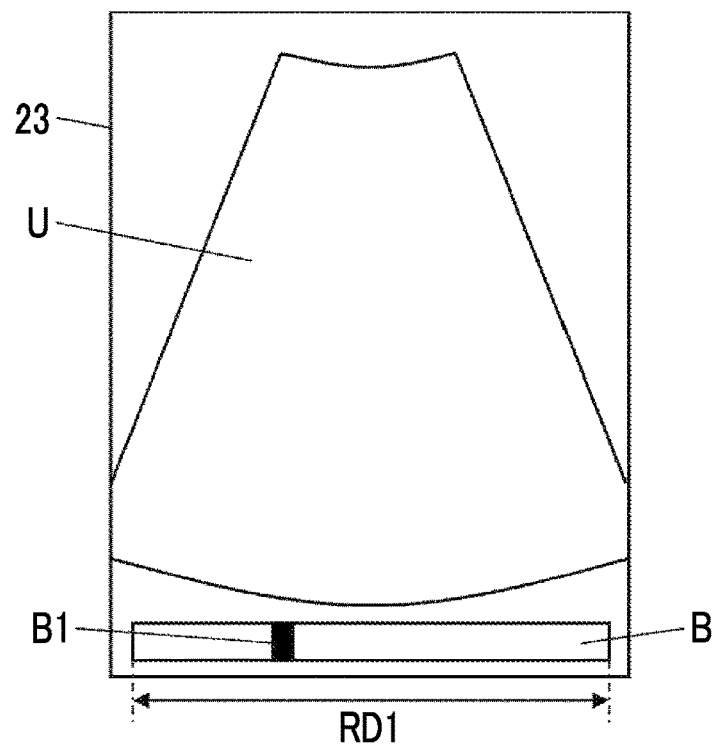
FIG. 12 is a diagram showing a second modification example of the user interface for setting the parameter during the non-operation of the specific target detection unit.

In addition, for example, as shown in FIG. 12, the display controller 22 can also display a slide bar B on the monitor 23 as the user interface for setting the parameter. FIG. 12 shows the slide bar B during the non-operation of the specific target detection unit 25. The user can set the parameter to a value corresponding to the position of a knob B1 of the slide bar B by moving the knob B1 to the right or left. The user can set the parameter within an adjustment range RD1 ranging from the upper limit to the lower limit of the parameter represented by the slide bar B during the non-operation of the specific target detection unit 25.

Figure 13:
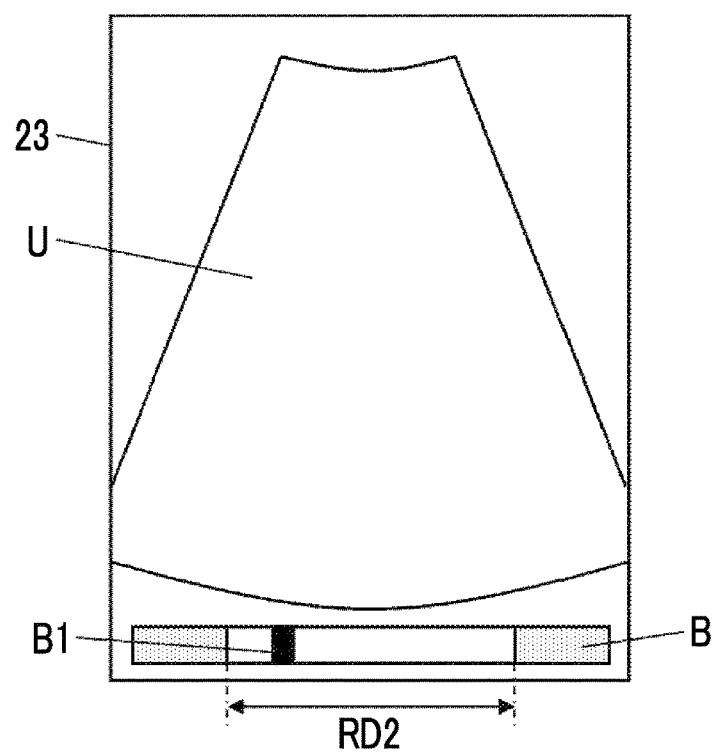
FIG. 13 is a diagram showing a second modification example of the user interface for setting the parameter during the operation of the specific target detection unit

For example, as shown in FIG. 13, the display controller 22 can display an adjustment range RD2, which is restricted by the parameter setting unit 26, by changing the display mode of the slide bar B during the operation of the specific target detection unit 25. The user can set the parameter in the adjustment range RD2 by moving the knob B1 to the right or left.

In addition, the display controller 22 can display the ultrasound image on the monitor 23 in different modes during the operation and during the non-operation of the specific target detection unit 25. For example, the display controller 22 can display on the monitor 23 a specific target T without particular emphasis in the ultrasound image U as shown in FIG. 4 during the non-operation of the specific target detection unit 25, and can display on the monitor 23 the specific target T with emphasis, such as emphasizing a contour C of the target T in the ultrasound image U as shown in FIG. 7, during the operation of the specific target detection unit 25.

The monitor 23 performs various kinds of display under the control of the display controller 22. The monitor 23 can include, for example, a display device such as a liquid crystal display (LCD) or an organic electroluminescence (EL) display.

Although the processor 32 including the image generation unit 21, the display controller 22, the detection controller 24, the specific target detection unit 25, the parameter setting unit 26, and the main body controller 27 is composed of a central processing unit (CPU) and a control program for causing the CPU to perform various types of processing, the processor 32 may be composed of a field programmable gate array (FPGA), a digital signal processor (DSP), an application specific integrated circuit (ASIC), a graphics processing unit (GPU), or other integrated circuits (ICs), or may be composed of a combination thereof.

In addition, the image generation unit 21, the display controller 22, the detection controller 24, the specific target detection unit 25, the parameter setting unit 26, and the main body controller 27 of the processor 32 can also be configured by being integrated partially or entirely into one CPU or the like.

Next, an example of the operation of the ultrasound diagnostic apparatus according to the embodiment will be described using the flowchart of FIG. 14. Here, it is assumed that, at the start of the examination, the plurality of parameters related to the acquisition of the ultrasound image U are set to predetermined values.

First, in step S1, the detection controller 24 determines whether or not to execute the detection processing of the specific target T through the specific target detection unit 25. In this case, the detection controller 24 can determine to execute the detection processing of the specific target T, for example, in a case where an instruction to detect the target T is input from the user via the input device 28. In addition, the detection controller 24 can determine to not execute the detection processing of the specific target T, for example, in a case where no instruction to detect the target T is input from the user via the input device 28.

In a case where it is determined in step S1 to not execute the detection processing of the specific target T, the process proceeds to step S2. In step S2, the detection controller 24 controls the specific target detection unit 25 to be in a non-operation state, and the parameter setting unit 26 sets a first adjustment range for a parameter adjustable by the user, for example, via the input device 28 such that the entire ultrasound image U can be relatively clearly depicted.

In subsequent step S3, in a state in which the user disposes the ultrasound probe 1 on the body surface of the subject, the image acquisition unit 31 acquires the ultrasound image U using the parameter with a predetermined value. In this case, the transducer array 11 of the ultrasound probe 1 transmits the ultrasound beam into the subject and receives the ultrasound echo from the inside of the subject, thereby generating the reception signal. The transmission and reception circuit 12 of the image acquisition unit 31 performs so-called reception focus processing on the reception signal to generate the sound ray signal, under the control of the main body controller 27. The sound ray signal generated by the transmission and reception circuit 12 is sent out to the image generation unit 21. The image generation unit 21 generates the ultrasound image U using the sound ray signal sent out from the transmission and reception circuit 12.

In step S4, the display controller 22 displays the ultrasound image U on the monitor 23, for example, as shown in FIG. 4. In this case, the display controller 22 can display the user interfaces A1 and A2, which are used for the user to set the parameters related to the acquisition of the ultrasound image U, on the monitor 23 together with the ultrasound image U.

In step S5, the user operates the user interfaces A1 and A2 via the input device 28 while confirming the ultrasound image U displayed on the monitor 23, and the parameter setting unit 26 sets the values of the parameters in response to the user's operations of the user interfaces A1 and A2. The parameter setting unit 26 supplies the parameters set in this manner to the image acquisition unit 31.

In step S6, the detection controller 24 determines whether or not to execute the detection processing of the specific target T through the specific target detection unit 25. In this case, the detection controller 24 can determine to execute the detection processing of the specific target T, for example, in a case where an instruction to detect the target T is input from the user via the input device 28. In addition, the detection controller 24 can determine to not execute the detection processing of the specific target T, for example, in a case where no instruction to detect the target T is input from the user via the input device 28.

In a case where it is determined in step S6 to not execute the detection processing of the specific target T, the process proceeds to step S7. In step S7, the main body controller 27 determines whether or not to end the examination of the subject that is currently being performed. For example, the main body controller 27 can determine to end the examination in a case where an instruction to end the examination is input from the user via the input device 28, and can determine to continue the examination in a case where no instruction to end the examination is input from the user via the input device 28.

In a case where it is determined in step S7 to continue the examination, the process returns to step S3, and the ultrasound image U is newly acquired using the parameter set by the user in step S5. In subsequent step S4, the ultrasound image U is displayed on the monitor 23, the parameter is set by the user in step S5, and it is determined in step S6 whether or not to execute the detection processing of the specific target T. In a case where it is determined in step S6 to not execute the detection processing of the target T, the process proceeds to step S7. In this manner, as long as it is determined in step S6 to not execute the detection processing of the target T and it is determined in step S7 to continue the examination, the processing of steps S3 to S7 is repeated.

Figure 14:
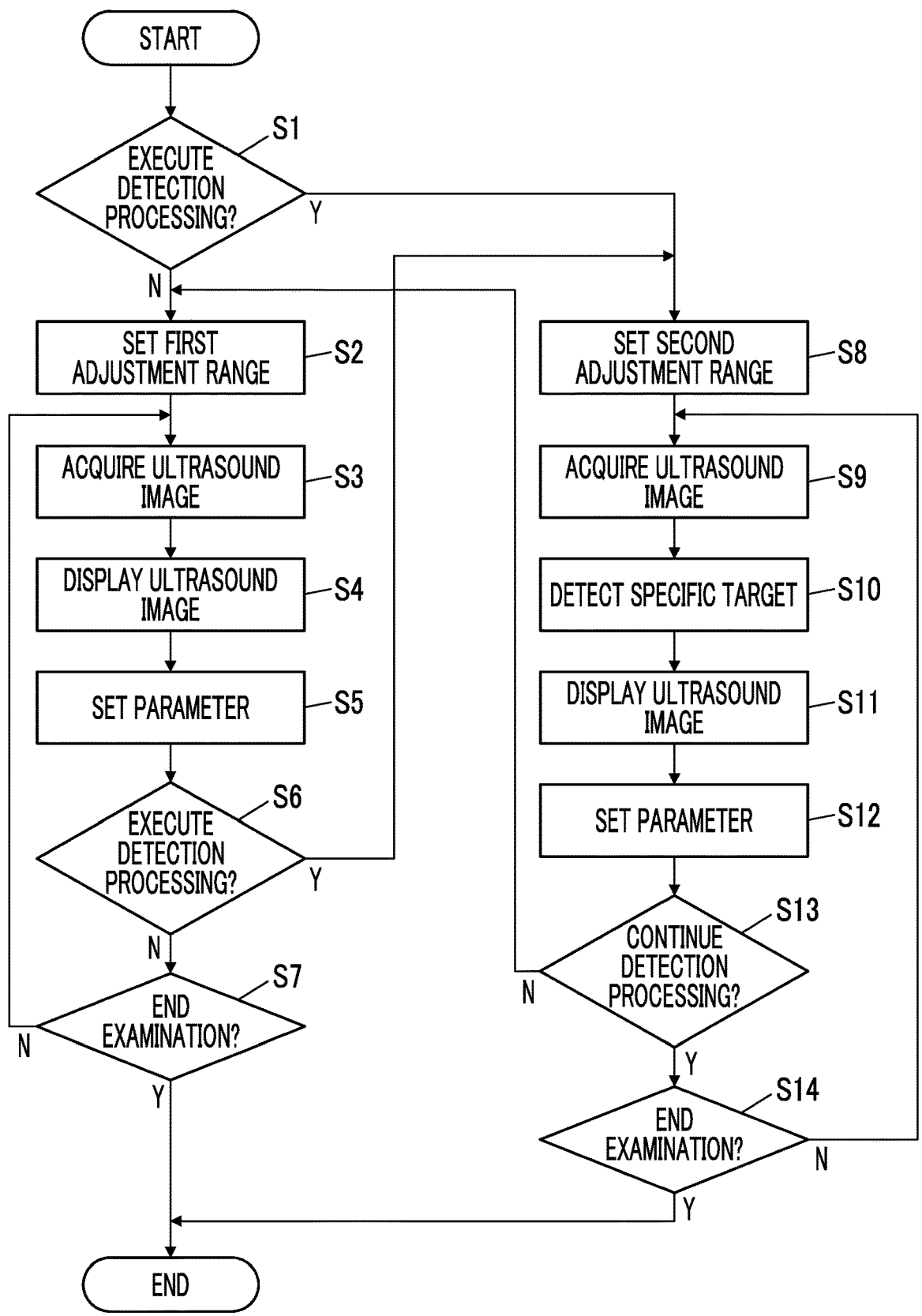
FIG. 14 is a flowchart showing an operation of the ultrasound diagnostic apparatus according to Embodiment of the present invention.

In a case where it is determined in step S7 to end the examination, the operation of the ultrasound diagnostic apparatus according to the flowchart of FIG. 14 is completed.

In a case where it is determined in steps S1 and S6 to execute the detection processing of the specific target T, the process proceeds to step S8. In this case, the specific type of the target T is also designated by the user.

In step S8, the parameter setting unit 26 sets a second adjustment range of the parameter, which is different from the first adjustment range of the parameter and is used to clearly depict the specific target T designated by the user in step S1 in the ultrasound image U. In this case, the parameter setting unit 26 can automatically set the value of the parameter settable by the user to a value within the second adjustment range, for example, a lower limit value of the second adjustment range. The second adjustment range of the parameter is an adjustment range selected according to the specific target T designated by the user.

In step S9, in a state in which the user disposes the ultrasound probe 1 on the body surface of the subject, the image acquisition unit 31 acquires the ultrasound image U using the parameter having the value within the second adjustment range set in step S8. The ultrasound image U acquired here clearly depicts the specific target T designated by the user in step S1.

In step S10, the specific target detection unit 25 uses a machine learning model that has learned in advance a large number of ultrasound images U showing the specific target T to detect the specific target T from the ultrasound image U acquired in step S9. Since the ultrasound image U clearly depicts the specific target T, the specific target detection unit 25 can detect the specific target T with high accuracy.

In step S11, for example, as shown in FIG. 7, the display controller 22 displays the ultrasound image U acquired in step S9 on the monitor 23. In this case, the display controller 22 can change the display modes of the user interfaces A1 and A2 to correspond to the second adjustment ranges of the parameters set in step S8, for example, as shown in FIGS. 8 and 9. The user can set the parameters in the second adjustment ranges using the user interfaces A1 and A2. In addition, the display controller 22 can display the target T with emphasis on the monitor 23 by emphasizing the contour C of the target T in the ultrasound image U. As a result, the user can easily grasp the presence of the target T.

In step S12, the user operates the user interfaces A1 and A2 via the input device 28 while confirming the ultrasound image U displayed on the monitor 23, and the parameter setting unit 26 sets the values of the parameters in response to the user's operations of the user interfaces A1 and A2. As a result, the user can set the parameter such that the specific target designated by the user in step S1 or S6 is more clearly depicted. The parameter setting unit 26 supplies the parameters set in this manner to the image acquisition unit 31.

In step S13, the detection controller 24 determines whether or not to continue the detection processing of the specific target T through the specific target detection unit 25. In this case, the detection controller 24 can determine to continue the detection processing of the specific target T, for example, in a case where no particular instruction to not detect the target T is input from the user via the input device 28. In addition, the detection controller 24 can determine to stop the detection processing of the specific target T, for example, in a case where an instruction to not detect the target T is input from the user via the input device 28.

In a case where it is determined in step S13 to continue the detection processing of the specific target T, the process proceeds to step S14. In step S14, the main body controller 27 determines whether or not to end the examination of the subject that is currently being performed.

In a case where it is determined in step S14 to continue the examination, the process returns to step S9, and the ultrasound image U is newly acquired using the parameter within the second adjustment range set in step S12. In subsequent step S10, the processing of detecting the specific target T from the ultrasound image U is performed, the ultrasound image U is displayed on the monitor 23 in step S11, the parameter having a value within the second adjustment range is set in step S12, and it is determined in step S13 whether or not to execute the detection processing of the specific target T. In a case where it is determined in step S13 to continue the detection processing of the specific target T, the process proceeds to step S14. In this manner, as long as it is determined in step S13 to continue the detection processing of the target T and it is determined in step S14 to continue the examination, the processing of steps S9 to S14 is repeated.

In a case where it is determined in step S13 to stop the detection processing of the specific target T, the process proceeds to step S2, and the first adjustment range is set by the parameter setting unit 26. Since the subsequent processing after step S3 has already been described, the description thereof will be omitted.

In a case where it is determined in step S14 to end the examination, the operation of the ultrasound diagnostic apparatus according to the flowchart of FIG. 14 is completed.

From the above, with the ultrasound diagnostic apparatus of the embodiment, the image acquisition unit 31 acquires the ultrasound image U of the subject using the ultrasound probe 1 and in accordance with the plurality of parameters related to the image acquisition, the specific target detection unit 25 detects the specific target T from the ultrasound image U using the machine learning model, and the parameter setting unit 26 sets, for a parameter that is settable by the user among the plurality of parameters, different adjustment ranges of the parameter during the operation and during the non-operation of the specific target detection unit 25, and supplies the parameter adjusted by the user to the image acquisition unit 31. Therefore, the ultrasound image U clearly depicting the specific target T is acquired during the operation of the specific target detection unit 25, and the detection accuracy of the target T by the specific target detection unit 25 can be improved.

Although it has been described that the transmission and reception circuit 12 is provided in the ultrasound probe 1, the transmission and reception circuit 12 may be provided in the apparatus main body 2.

In addition, although it has been described that the image generation unit 21 is provided in the apparatus main body 2, the image generation unit 21 may be provided in the ultrasound probe 1.

Further, the apparatus main body 2 may be a so-called stationary type, a portable type that is easy to carry, or a so-called handheld type that is composed of, for example, a smartphone or a tablet type computer. As described above, the type of the device that constitutes the apparatus main body 2 is not particularly limited.

In addition, the parameter setting unit 26 can also automatically determine and set the adjustment range of the parameter corresponding to the target T detected from the ultrasound image U during the operation of the specific target detection unit 25. As a result, since the user does not need to manually switch the types of the target T, for example, even in a case where the target T that the user wants to observe is changed during the examination, the examination can proceed smoothly.

In addition, the parameter setting unit 26 can set different presets during the operation and during the non-operation of the specific target detection unit 25 for a preset that is not settable by the user among the plurality of parameters, and can supply the set preset to the image acquisition unit 31. Here, the preset refers to a value set in advance in the parameter related to the acquisition of the ultrasound image U. A preset for clearly depicting the specific target T is set even for the preset, which is not settable by the user among the plurality of parameters, during the operation of the specific target detection unit 25, so that the specific target T can be clearly depicted in the ultrasound image U, and the detection accuracy of the target T can be further improved through the specific target detection unit 25.

In addition, the display controller 22 can also display on the monitor 23 a message indicating that the specific target detection unit 25 is operating or a message indicating that the specific target detection unit 25 is not operating. As a result, the user can easily grasp the operation state of the specific target detection unit 25.

EXPLANATION OF REFERENCES

1: ultrasound probe
2: apparatus main body
11: transducer array
12: transmission and reception circuit
21: image generation unit
22: display controller
23: monitor
24: detection controller
25: specific target detection unit
26: parameter setting unit
27: main body controller
28: input device
31: image acquisition unit
32: processor
41: pulsar
42: amplification section
43: AD conversion section
44: beam former
45: signal processing section
46: DSC
47: image processing section
A1, A2: user interface
B: slide bar
B1: knob
C: contour
G: gradation
L1, L2: parameter setting line
RA1, RA2, RB1, RB2, RC1, RC2, RD1, RD2: adjustment range
T: target
U: ultrasound image

What is claimed is:

1. An ultrasound diagnostic apparatus comprising:
an ultrasound probe; and
a processor configured to
acquire an ultrasound image of a subject using the ultrasound probe and in accordance with a plurality of parameters related to image acquisition, and
perform a detection processing of a specific target from the ultrasound image using a machine learning model,
wherein the processor is configured to operate either in a first mode to not perform the detection processing or in a second mode to perform the detection processing, based on an instruction from a user,
wherein the processor is configured to set, for a parameter that is settable by the user among the plurality of parameters, first adjustment ranges of the parameter during the first mode, and
acquire a first ultrasound image based on the parameter which is adjusted by the user in the set first adjustment ranges, and
wherein the processor is configured to set, for the parameter that is settable by the user among the plurality of parameters, second adjustment ranges of the parameter which is different from the first adjustment ranges of the parameter during the second mode,
acquire a second ultrasound image based on the parameter which is adjusted by the user in the set second adjustment ranges, and
perform the detection processing from the second ultrasound image.

2. The ultrasound diagnostic apparatus according to claim 1,
wherein the processor is configured to set an adjustment range of at least one parameter of a depth, a gain, or a sound velocity.

3. The ultrasound diagnostic apparatus according to claim 1,
wherein the processor is configured to
set first presets during the first mode,
acquire the first ultrasound image based on the first presets,
set second presets which are different from the first presets during the second mode, and
acquire the second ultrasound image based on the second presets.

4. The ultrasound diagnostic apparatus according to claim 1, further comprising:
a monitor,
wherein the processor is configured to display the first ultrasound image during the first mode and the second ultrasound image during the second mode on the monitor in different modes.

5. The ultrasound diagnostic apparatus according to claim 4,
wherein the processor is configured to
set the second adjustment ranges of the parameter corresponding to the target which is detected from the second ultrasound image during the second mode, and
acquire the second ultrasound image based on the second adjustment ranges.

6. The ultrasound diagnostic apparatus according to claim 4,
wherein the processor is configured to detect, as the specific target, any of an organ, a blood vessel, a stool, a urine, a nerve, an ascites fluid, a pleural fluid, a suspected abnormal site, or a B-line.

7. The ultrasound diagnostic apparatus according to claim 4,
wherein the processor is configured to set an adjustment range of at least one parameter of a depth, a gain, or a sound velocity.

8. The ultrasound diagnostic apparatus according to claim 4,
wherein the processor is configured to
set first presets during the first mode,
acquire the first ultrasound image based on the first presets,
set second presets which are different from the first presets during the second mode, and
acquire the second ultrasound image based on the second presets.

9. The ultrasound diagnostic apparatus according to claim 4,
wherein the processor is configured to
set the first adjustment ranges of the parameter and display the first adjustment ranges of the parameter on the monitor during the first mode, and
set the second adjustment ranges of the parameter and display the second adjustment ranges of the parameter on the monitor during the second mode.

10. The ultrasound diagnostic apparatus according to claim 9,
wherein the processor is configured to
set the second adjustment ranges of the parameter corresponding to the target which is detected from the second ultrasound image during the second mode, and acquire the second ultrasound image based on the second adjustment ranges.

11. The ultrasound diagnostic apparatus according to claim 9,
wherein the processor is configured to detect, as the specific target, any of an organ, a blood vessel, a stool, a urine, a nerve, an ascites fluid, a pleural fluid, a suspected abnormal site, or a B-line.

12. The ultrasound diagnostic apparatus according to claim 9,
wherein the processor is configured to set an adjustment range of at least one parameter of a depth, a gain, or a sound velocity.

13. The ultrasound diagnostic apparatus according to claim 9,
wherein the processor is configured to set first presets during the first mode,
acquire the first ultrasound image based on the first presets,
set second presets which are different from the first presets during the second mode, and
acquire the second ultrasound image based on the second presets.

14. The ultrasound diagnostic apparatus according to claim 1,
wherein the processor is configured to
set the second adjustment ranges of the parameter corresponding to the target which is detected from the second ultrasound image during the second mode, and
acquire the second ultrasound image based on the second adjustment ranges.

15. The ultrasound diagnostic apparatus according to claim 14,
wherein the processor is configured to detect, as the specific target, any of an organ, a blood vessel, a stool, a urine, a nerve, an ascites fluid, a pleural fluid, a suspected abnormal site, or a B-line.

16. The ultrasound diagnostic apparatus according to claim 14,
wherein the processor is configured to set an adjustment range of at least one parameter of a depth, a gain, or a sound velocity.

17. The ultrasound diagnostic apparatus according to claim 14,
wherein the processor is configured to
set first presets during the first mode,
acquire the first ultrasound image based on the first presets,
set second presets which are different from the first presets during the second mode, and
acquire the second ultrasound image based on the second presets.

18. The ultrasound diagnostic apparatus according to claim 1,
wherein the processor is configured to detect, as the specific target, any of an organ, a blood vessel, a stool, a urine, a nerve, an ascites fluid, a pleural fluid, a suspected abnormal site, or a B-line.

19. The ultrasound diagnostic apparatus according to claim 18,
wherein the processor is configured to set an adjustment range of at least one parameter of a depth, a gain, or a sound velocity.

20. A control method of an ultrasound diagnostic apparatus comprising:
acquiring an ultrasound image of a subject using the ultrasound probe and in accordance with a plurality of parameters related to image acquisition;
performing a detection processing of a specific target from the ultrasound image using a machine learning model,
wherein operating either in a first mode to not perform the detection processing or in a second mode to perform the detection processing, based on an instruction from a user,
setting, for a parameter that is settable by the user among the plurality of parameters, first adjustment ranges of the parameter during the first mode, and
acquiring a first ultrasound image based on the parameter which is adjusted by the user in the set first adjustment range, and
setting, for the parameter that is settable by the user among the plurality of parameters, second adjustment ranges of the parameter which is different from the first adjustment ranges of the parameter during the second mode;
acquiring a second ultrasound image based on the parameter which is adjusted by the user in the set second adjustment range, and
performing the detection processing from the second ultrasound image.

* * * * *